United States Patent
Bakke et al.

(10) Patent No.: US 7,634,453 B1
(45) Date of Patent: Dec. 15, 2009

(54) DISTRIBUTED FILE DATA LOCATION

(75) Inventors: Mark A. Bakke, Maple Grove, MN (US); Harold G. Varnis, Maple Grove, MN (US)

(73) Assignee: Storage Technology Corporation, Louisville, CO (US)

(*) Notice: Subject to any disclaimer, the term of this patent is extended or adjusted under 35 U.S.C. 154(b) by 1612 days.

(21) Appl. No.: 09/373,795

(22) Filed: Aug. 13, 1999

(51) Int. Cl.
  G06F 17/30 (2006.01)
  G06F 17/00 (2006.01)
  G06F 15/16 (2006.01)

(52) U.S. Cl. ............... 707/1; 707/10; 707/102; 707/200; 709/203

(58) Field of Classification Search ............ 707/1–2, 707/10, 100–104, 200–205, 104.1; 709/107, 709/203, 218–219, 221, 212, 220–224, 226, 709/229, 330, 250, 210–211; 711/163–164, 711/118, 170; 713/200–201
See application file for complete search history.

(56) References Cited

U.S. PATENT DOCUMENTS

| | | | |
|---|---|---|---|
| 4,104,718 A | 8/1978 | Poublan et al. ............... 707/8 |
| 5,113,519 A | 5/1992 | Johnson et al. .............. 707/201 |
| 5,163,131 A | 11/1992 | Row et al. ................... 709/202 |
| 5,313,646 A | 5/1994 | Hendricks et al. ............ 707/101 |
| 5,355,453 A | 10/1994 | Row et al. ................... 709/219 |
| 5,379,424 A | 1/1995 | Morimoto et al. .............. 707/2 |
| 5,434,975 A | 7/1995 | Allen ......................... 709/312 |
| 5,559,984 A * | 9/1996 | Nakano et al. ............... 711/121 |
| 5,561,799 A | 10/1996 | Khalidi et al. ............... 707/200 |
| 5,577,252 A * | 11/1996 | Nelson et al. ............... 709/100 |
| 5,611,065 A | 3/1997 | Alferness et al. ............. 711/220 |
| 5,623,666 A | 4/1997 | Pike et al. ................... 707/200 |
| 5,627,996 A | 5/1997 | Bauer ......................... 703/20 |
| 5,634,028 A | 5/1997 | Brady et al. ................... 711/4 |
| 5,634,048 A | 5/1997 | Ryu et al. ..................... 707/10 |
| 5,689,701 A | 11/1997 | Ault et al. .................... 707/10 |
| 5,694,568 A | 12/1997 | Harrison, III et al. ......... 711/213 |
| 5,701,462 A | 12/1997 | Whitney et al. ................ 707/10 |
| 5,737,549 A | 4/1998 | Hersch et al. ................ 710/129 |
| 5,761,498 A * | 6/1998 | Ooe et al. .................... 707/10 |

(Continued)

FOREIGN PATENT DOCUMENTS

EP  0398493  * 11/1990  ............ 15/40

(Continued)

OTHER PUBLICATIONS

Rao, HC, towards a national collaboratory: an internet file system, systems integration, 1992, ICSI, proceedings of the second internetional conference, 1992, pp. 489-498.*

(Continued)

*Primary Examiner*—Srirama Channavajjala
(74) *Attorney, Agent, or Firm*—Brooks Kushman P.C.

(57) ABSTRACT

Locating data within a heterogenous distributed file system is difficult due to the many file access standards in use. A file system for easily locating data includes storage devices holding at least one copy of each file. At least one location server maps a file identifier for each file into the location of a copy of the file represented by the file identifier. One or more name servers map a file name into the file identifier referenced by the file name.

5 Claims, 4 Drawing Sheets

U.S. PATENT DOCUMENTS

| | | | |
|---|---|---|---|
| 5,787,498 A | 7/1998 | Lee et al. | 711/221 |
| 5,802,366 A | 9/1998 | Row et al. | 709/250 |
| 5,832,510 A | 11/1998 | Ito et al. | 707/201 |
| 5,842,214 A | 11/1998 | Whitney et al. | 707/10 |
| 5,845,126 A | 12/1998 | Ju et al. | 717/8 |
| 5,860,156 A | 1/1999 | Williams | 711/221 |
| 5,873,085 A * | 2/1999 | Enoki et al. | 707/10 |
| 5,923,846 A * | 7/1999 | Gage et al. | 709/213 |
| 5,948,062 A * | 9/1999 | Tzelnic et al. | 709/219 |
| 5,978,791 A * | 11/1999 | Farber et al. | 707/2 |
| 5,987,476 A * | 11/1999 | Imai et al. | 707/201 |
| 5,987,506 A * | 11/1999 | Carter et al. | 709/213 |
| 5,991,763 A * | 11/1999 | Long et al. | 707/10 |
| 6,029,168 A * | 2/2000 | Frey | 707/10 |
| 6,081,807 A * | 6/2000 | Story et al. | 707/101 |
| 6,122,631 A * | 9/2000 | Berbec et al. | 707/9 |
| 6,161,111 A * | 12/2000 | Mutalik et al. | 707/205 |
| 6,230,246 B1 * | 5/2001 | Lee et al. | 711/167 |
| 6,336,115 B1 * | 1/2002 | Tominaga et al. | 707/10 |

FOREIGN PATENT DOCUMENTS

| | | | | |
|---|---|---|---|---|
| EP | 0 774 723 A2 | | 5/1997 | |
| GB | 2357171 | * | 6/2001 | 17/30 |
| WO | WO-96-23268 | * | 8/1996 | 17/30 |

OTHER PUBLICATIONS

Herman C Rao et al. "accessing files in an Internet: the Jade file system", IEEE transactions on software engineering, vol. 19, No. 6, Jun. 1993, pp. 613-624.*

* cited by examiner

DISTRIBUTED FILE DATA LOCATION

TECHNICAL FIELD

The present invention relates to locating data stored on distributed computer systems.

BACKGROUND ART

Computer data is stored to permit the data to be accessed at a later time, from a different location, as well as by a different user. Data is stored on a variety of media including magnetic devices such as disks and tapes, optical media, magneto-optical media, and the like. Data may also be stored in a variety of formats. Traditionally, data has been stored in files with each file composed of one or more extents. An extent is a variable length contiguous region of the storage medium. Alternatively, data may be encapsulated as an object. For convenience, the term file will be used to represent both traditional files and objects.

In order to provide more efficient use of storage space and to increase accessibility by multiple users, data is typically held at one or more hosts or servers interconnected to users or clients. Such a system, known as a distributed file system, may support many host types, user communities, and storage facilities. Locating data becomes increasingly complicated when hosts and users implement different naming schemes resulting from the use of different file naming standards, the use of different operating systems and from different storage access requirements.

Traditional distributed file systems consist of clients accessing storage through a server. The client provides a file name to the server. The server responds by providing a file identifier to the client. The client then issues data access requests to the server using the file identifier. Such a system is implemented in the Unix-based NFS (Network File System) and in the CIFS (Common Internet File System) found in the Microsoft WINDOWS NT® server.

Recently, another technique has been proposed which separates the data in one or more logical volumes from the supporting information such as metadata, data locations, and file name mapping in a separate logical volume. A client first accesses the support information to obtain the file location and file identifier. The client then accesses the data using the file identifier. Such a system is implemented in the CROSSSTOR FS from CrosStor Software Inc. of South Plainfield, N.J. and in the Network Attached Storage Device (NASD) from the Parallel Data Laboratory of Carnegie Mellon University in Pittsburgh, Pa.

While each of these systems offers many advantages, none satisfactorily solve the problem of data location in heterogenous distributed file systems. What is needed is a file system implementation flexible enough to accommodate the dynamism of a heterogenous distributed file system. The file system should scale well to large numbers of participating components and offer protection from component outages by allowing redundant providers of critical services and replication of user data. The system should allow administration activities to occur without undue disruption of general system operation. The file system should allow available resources to be used in ways optimized for the particular policy goals of the owning organization. Further, these features should be as transparent as possible to the users of client systems.

DISCLOSURE OF INVENTION

It is an object of the present invention to provide a file system for locating data accessible through more than one naming scheme.

It is another object of the present invention to provide a file system that is scalable.

It is still another object of the present invention to provide a file system that is fault tolerant.

It is yet another object of the present invention to provide data location in a heterogenous distributed file system.

It is a further object of the present invention to provide data location for a plurality of host types, user communities, and storage facilities.

In carrying out the above objects and other objects and features of the present invention, a file system for storing data is provided. The file system includes storage devices operative to store at least one copy of at least one file. One or more location servers map a file identifier for each file into the location of each copy of the file. One or more name servers map a file name to the file identifier referenced by the file name.

In an embodiment of the present invention, each file is stored as at least one file extent. The file identifier includes a file handle. A file may also be represented in storage as an object, with the file identifier being an object identifier.

In another embodiment of the present invention, each location database stores metadata associated with each file identifier.

In still another embodiment of the present invention, the file system includes at least one client. The client requests a file identifier for a new file from a location server. The client receives the requested file identifier. The client registers the file identifier and a new file name with at least one name server. When data is to be written, a client sends a requested file name to the name server. A file identifier corresponding to the requested file name and an indicated location server are received from the name server. Updated locations for the write operation are requested from the indicated location server. Data is then written into the received updated locations. Similarly, when data is to be read, a client sends a requested file name to the name server. A file identifier corresponding to the requested file name and an indicated location server is received from the name server. The location of data corresponding to the file identifier is requested from the indicated location server. Data is then read from the received requested locations. A new name for an existing file may be registered by first sending an existing file name to the name server. A file identifier corresponding to the existing file is received from the name server. The file identifier and the new name for the existing file are sent to one or more name servers.

A method for accessing a file referenced by a file name is also provided. The method includes sending the file name to a name server. A file identifier corresponding to the file name is received from the name server. The file identifier is sent to a location server separate from the name server. File location information corresponding to the file identifier is received from the location server. The file is then accessed using the location information.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
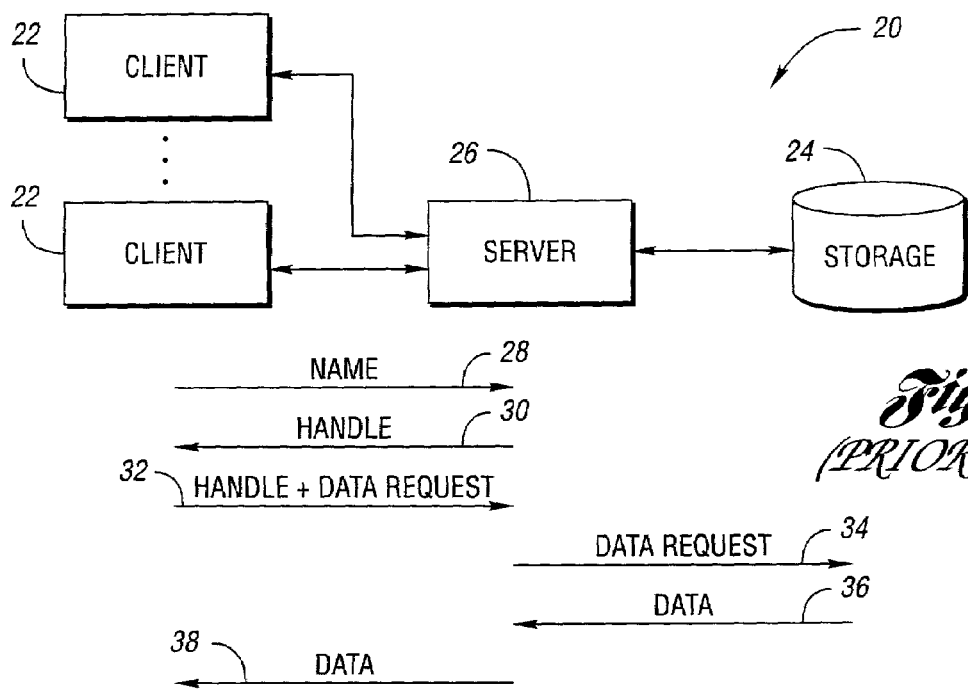
FIG. 1 is a schematic diagram illustrating a prior art client-server relationship.

Referring to FIG. 1, a schematic diagram illustrating a prior art client-server relationship is shown. A file system, shown generally by 20, includes clients 22 accessing data held in files on one or more storage devices 24. Each storage device 24 is accessed through a server, one of which is indicated by 26. A typical example of file system 20 is the Unix-based Network File System (NFS). In NFS, client 22 wishing to access data first forwards the name of the file containing the data to server 26, as shown by 28. Server 26 returns a handle to the requested file as indicated by 30. Client 22 then forwards a data request with the received handle to server 26, as indicated by 32. Server 26 requests the data from storage device 24, as indicated by 34. Storage device 24 returns the data to server 26, as indicated by 36, and server 26 forwards the data to client 22, as indicated by 38. Another typical example of file system 20 is embodied in the CIFS (Common Internet File System) found in the WINDOWS NT® server by Microsoft Corp. Server 26 provides a file descriptor in response to a name provided by client 22. Client 22 uses the file descriptor to access data through a logical connection through server 26 to storage device 24. The file descriptor is valid only for the life of the connection.

There are several problems associated with the traditional client-server system. First, server 26 may not have sufficient resources to support an increasing number of clients 22. Second, the failure of server 26 makes storage device 24 inaccessible by clients 22. Third, a client 22 not directly connected to server 26 may have difficulty locating and accessing a file stored on storage device 24 connected to server 26. Finally, server 26 may not be able to properly respond to client 22 requesting a file using a naming scheme different than the scheme used by server 26.

Figure 2:
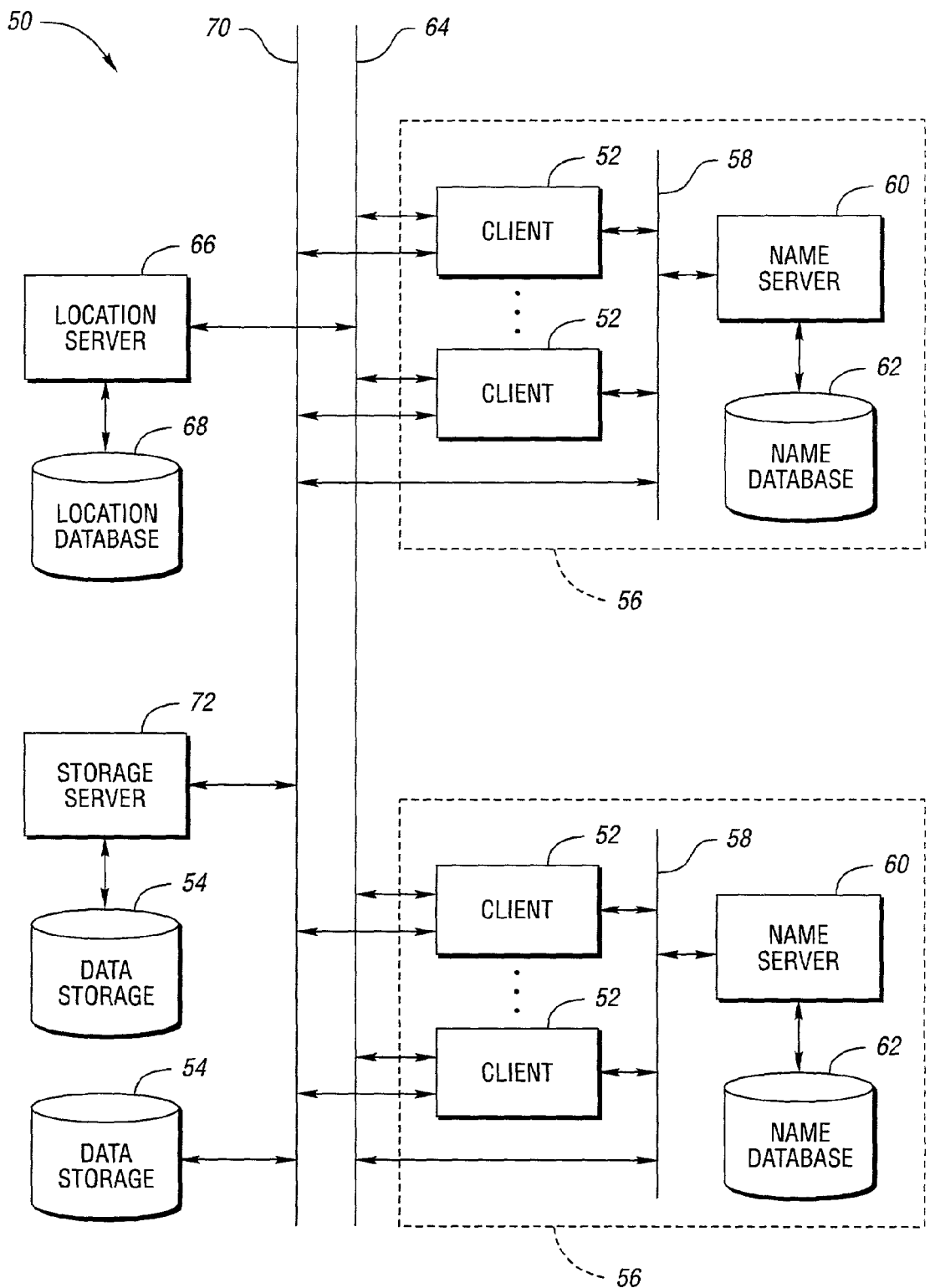
FIG. 2 is a schematic diagram of a file system according to an embodiment of the present invention.

Referring now to FIG. 2, a schematic diagram of a file system according to an embodiment of the present invention is shown. A file system, shown generally by 50, includes a plurality of clients 52 accessing data held in files on one or more storage devices 54. Each client 52 uses a particular naming scheme typically dependent upon the file access standard used by client 52. Clients 52 with similar naming schemes may be logically clustered by client group 56. Clients 52 within client group 56 may be connected by, for example, local area network 58 to name server 60. Each name server 60 maintains name database 62 which maps a file name into a file identifier such as a file handle, object identifier, or the like. Clients 52 are also connected through network 64 to name servers 60 in other client groups 56. This gives client 52 the ability to register a file name with more than one name server 60. Network 64 may be a local area network and may be the same as local area network 58.

Location server 66 is in communication with clients 52. This may be accomplished by connecting location server 66 to network 64. Location server 66 maintains location database 68 which maps a file identifier into specific information about the location of each copy of the file represented by the file identifier. In an embodiment of the present invention, location database 68 also includes metadata, such as file creation information, file edit information, file authorization information, and the like associated with each file identifier. File system 50 may include more than one location server 66 and location database 68 to provide redundancy and to distribute the task of location mapping.

Clients 52 are in communication with data storage devices 54. This may be accomplished, for example, through storage area network 70. Data storage devices 54 may be connected directly to storage area network 70 or may be connected through storage server 72. Once the file identifier is mapped by location server 66, client 52 accesses the file on data storage device 54. Networks 58, 64, 70 may be the same network or may be different networks and may be implemented as local area networks (LANs), wide area networks (WANs), storage are networks, (SANs), and the like.

Figure 3:
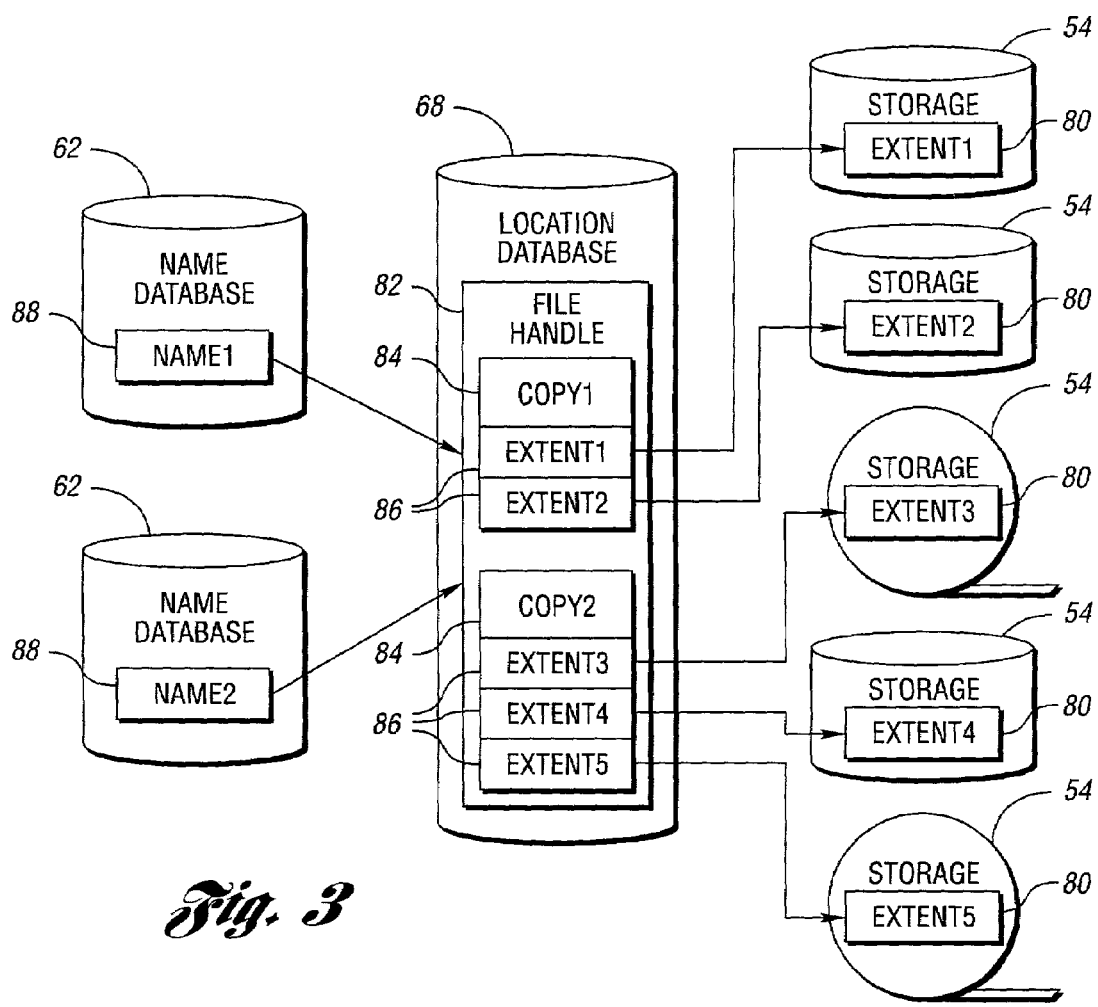
FIG. 3 is a schematic diagram illustrating file accessing according to an embodiment of the present invention.

Referring now to FIG. 3, a schematic diagram illustrating file accessing according to an embodiment of the present invention is shown. A copy of a file may be divided into one or more extents 80. These extents 80 may be stored on one or more storage devices 54. Location database 68 maintains a record for each file held in storage devices 54. For traditional files, this record is file handle record 82 referenced by the file handle. File handle record 82 includes copy record 84 for each copy of the file held in storage devices 54. Each copy record 84 includes extent pointers 86 indicating the location of each extent 80 which makes up the file copy. If the file is an object, the file record is referenced using the object identifier. Hence, location database 68 permits a mapping of the file identifier into the location or locations for the file referenced by the identifier.

Each name database 62 may contain one or more logical names 88 for a given file. The format for names 88 may vary within and between name databases 62 depending on the file access standards supported. Each logical name 88 is associated with a file identifier. Hence, name database 62 permits a mapping of logical name 88 to the file identifier referenced by file name 88.

Figure 4:
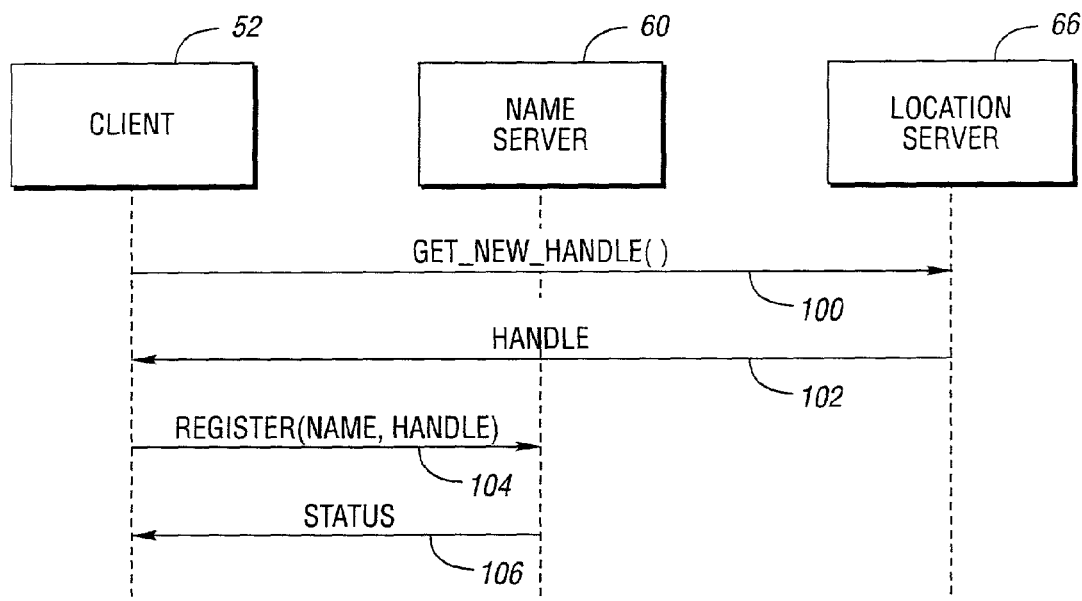
FIG. 4 is a schematic diagram illustrating file naming according to an embodiment of the present invention.

Referring now to FIG. 4, a schematic diagram illustrating file naming according to an embodiment of the present invention is shown. Client 52 wishing to store a new file first requests a file identifier from location server 66. For a traditional file, this may be a request for a new handle, as indicated by 100. For objects, this may be a request for an object identifier. Location server 66 responds to the request by providing an object identifier such as a file handle, as indicated by 102. Client 52 then registers name 88 by sending name 88 and the file identifier to name server 60, as shown by 104. Name server 60 indicates the success or failure of name registration by returning status to client 52, as shown by 106. Possible failures include attempting to register name 88 that is already in use.

Figure 5:
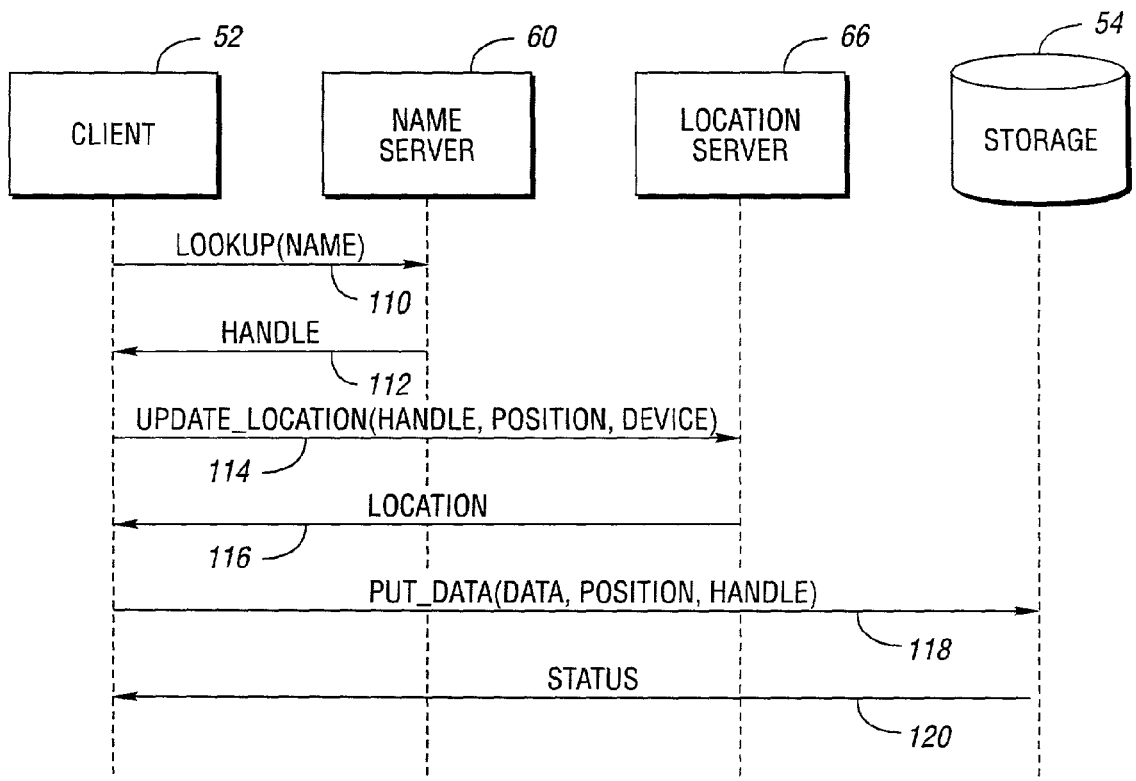
FIG. 5 is a schematic diagram illustrating a write operation according to an embodiment of the present invention.

Referring now to FIG. 5, a schematic diagram illustrating a write operation according to an embodiment of the present invention is shown. Client 52 first looks up the name of the file to be written in name server 60, as indicated by 110. Name server 60 returns to client 52 a file identifier, such as a file handle, if the name is known to name server 60, as indicated by 112. Client 52 sends a request to update locations to location server 66. For traditional files, the update request may include the file handle, extent position, and storage device, as indicated by 114. Location server 66 responds to client 52 with one or more locations on storage device 54 which may be written. Client 52 proceeds with one or more writes to storage device 54, as indicated by 118. After each write, storage device 54 returns status to client 52, as indicated by 120. If the file to be written is an object, data may be written to storage device 54 immediately following receiving a file identifier from name server 60. Locations are updated in location server 66 following successful completion of the write operation.

Figure 6:
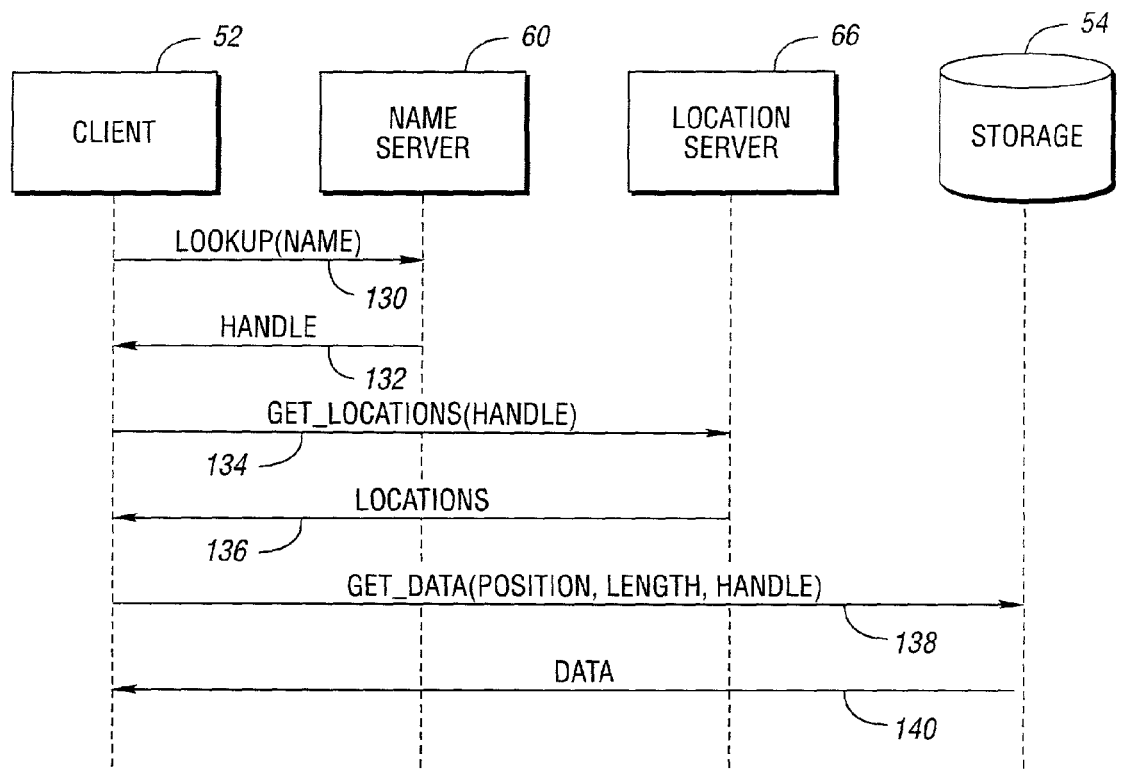
FIG. 6 is a schematic diagram illustrating a read operation according to an embodiment of the present invention.

Referring now to FIG. 6, a schematic diagram illustrating a read operation according to an embodiment of the present invention is shown. Client 52 requesting to read data from storage device 54 first sends the name of the requested file to name server 60, as indicated by 130. Name server 60 responds by sending the file identifier to client 52, indicated by the file handle in 132. Client 52 sends a location request to location server 66 which includes the file identifier, as indicated by 134. Location server 66 responds by sending client 52 locations for the file, as indicated by 136. Client 52 then performs one or more read operations by directly accessing storage device 54, as indicated by 138. Storage device 54 responds to each read request by providing data to client 52, as indicated by 140.

Figure 7:
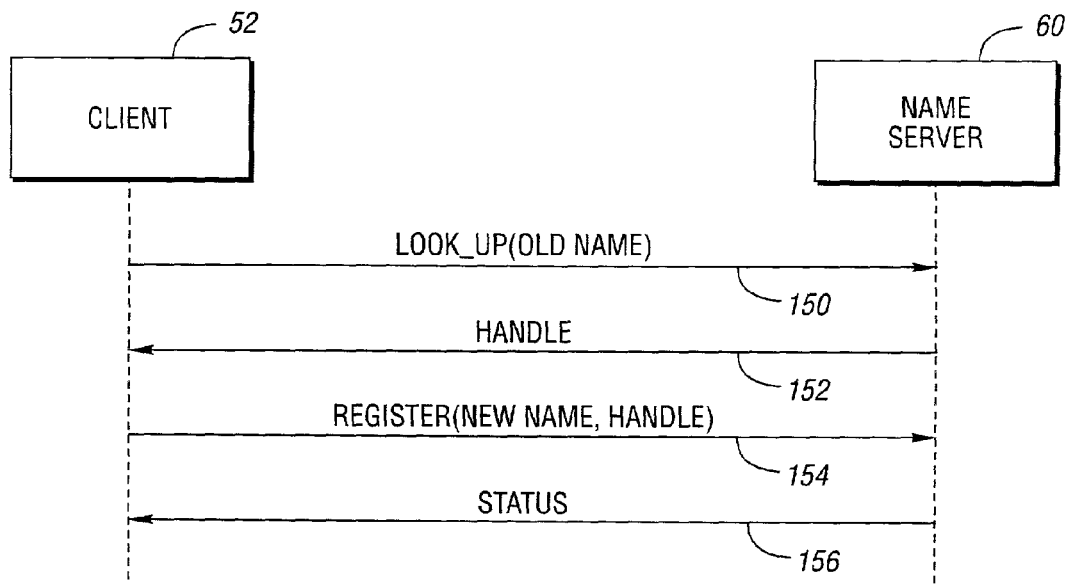
FIG. 7 is a schematic diagram illustrating file renaming according to an embodiment of the present invention.

Referring now to FIG. 7, a schematic diagram illustrating file renaming according to an embodiment of the present invention is shown. Client 52 may change the name of a file within name server 80, add a new name for a file to name server 60, or register a file name with one or more different name servers 60. Client 52 first sends the old name for the file to name server 60, as indicated by 150. Name server 60 responds by sending client 52 the file identifier, such as the file handle as indicated by 152. Client 52 then registers the new file name by sending the new file name and the file identifier to name server 60, as indicated by 154. Name server 60 responds to client 52 by providing status 156.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A file system for storing data comprising:
  a plurality of storage devices, each storage device operative to store at least one copy of at least one file;
  at least one location database comprising a map between a file identifier for each file and location information for each copy of the file represented by the file identifier;
  at least one name database comprising a map between a file name and the file identifier referenced by the file name, each name database physically separate from the at least one location database; and
  at least one client operative to
  (a) request a file identifier corresponding to a requested file name,
  (b) receive the file identifier mapped to the requested file name,
  (c) request location information corresponding to the received file identifier,
  (d) receive location information mapped to the received file identifier, and
  (e) access data using the location information.

2. A file system as in claim 1 wherein each file is stored as at least one file extent, the file identifier comprising a file handle.

3. A file system as in claim 1 wherein each file is represented in storage as an object and each file identifier is an object identifier.

4. A file system as in claim 1 wherein the client is further operative to access file metadata stored in the location database.

5. A file system as in claim 1 wherein the client is further operative to send the file identifier and a new file name to at least one name database, thereby registering the new name for the file.

\* \* \* \* \*